May 30, 1944. P. E. GELDHOF ET AL 2,350,108
WASHING MACHINE AND DRIER
Filed Dec. 30, 1939 14 Sheets-Sheet 1

INVENTORS
PETER EDUARD GELDHOF
LUTHER RINGER
BY
H. C. ~~~~
ATTORNEY

May 30, 1944.  P. E. GELDHOF ET AL  2,350,108
WASHING MACHINE AND DRIER
Filed Dec. 30, 1939  14 Sheets-Sheet 2

INVENTORS
PETER EDUARD GELDHOF
LUTHER RINGER
BY
ATTORNEY

May 30, 1944.　　P. E. GELDHOF ET AL　　2,350,108
WASHING MACHINE AND DRIER
Filed Dec. 30, 1939　　14 Sheets-Sheet 5

INVENTORS
PETER EDUARD GELDHOF
LUTHER RINGER
BY
ATTORNEY

May 30, 1944.  P. E. GELDHOF ET AL  2,350,108
WASHING MACHINE AND DRIER
Filed Dec. 30, 1939   14 Sheets-Sheet 6

INVENTORS
PETER EDUARD GELDHOF
LUTHER RINGER
BY
ATTORNEY

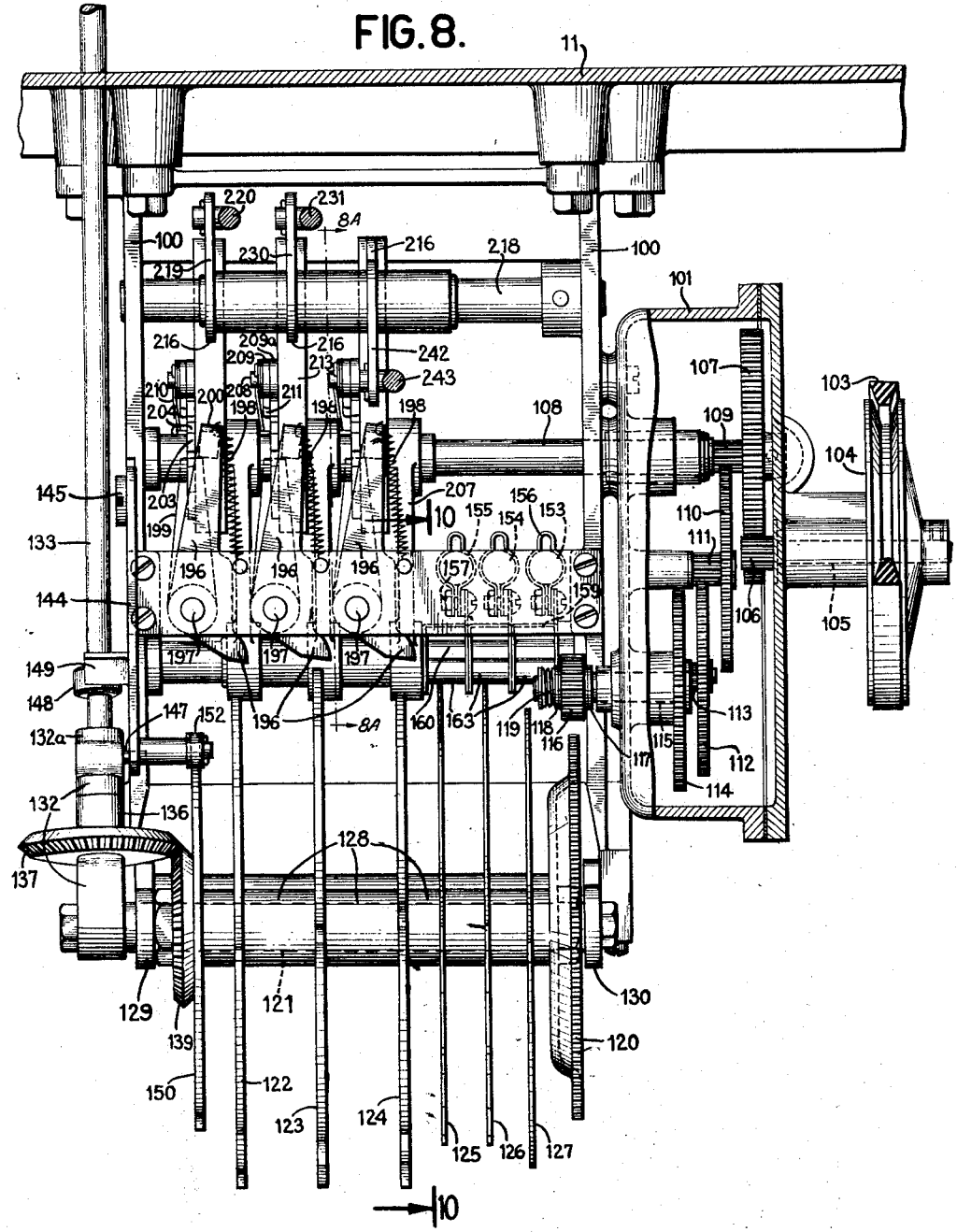

INVENTORS
PETER EDUARD GELDHOF
LUTHER RINGER
BY
Charles Hills
ATTORNEY

May 30, 1944.  P. E. GELDHOF ET AL  2,350,108
WASHING MACHINE AND DRIER
Filed Dec. 30, 1939  14 Sheets-Sheet 9

INVENTORS
PETER EDUARD GELDHOF
LUTHER RINGER
BY
ATTORNEY

May 30, 1944.　　　P. E. GELDHOF ET AL　　　2,350,108
WASHING MACHINE AND DRIER
Filed Dec. 30, 1939　　　14 Sheets-Sheet 10

INVENTORS
PETER EDUARD GELDHOF
LUTHER RINGER
BY
ATTORNEY

May 30, 1944. P. E. GELDHOF ET AL 2,350,108
WASHING MACHINE AND DRIER
Filed Dec. 30, 1939 14 Sheets-Sheet 11
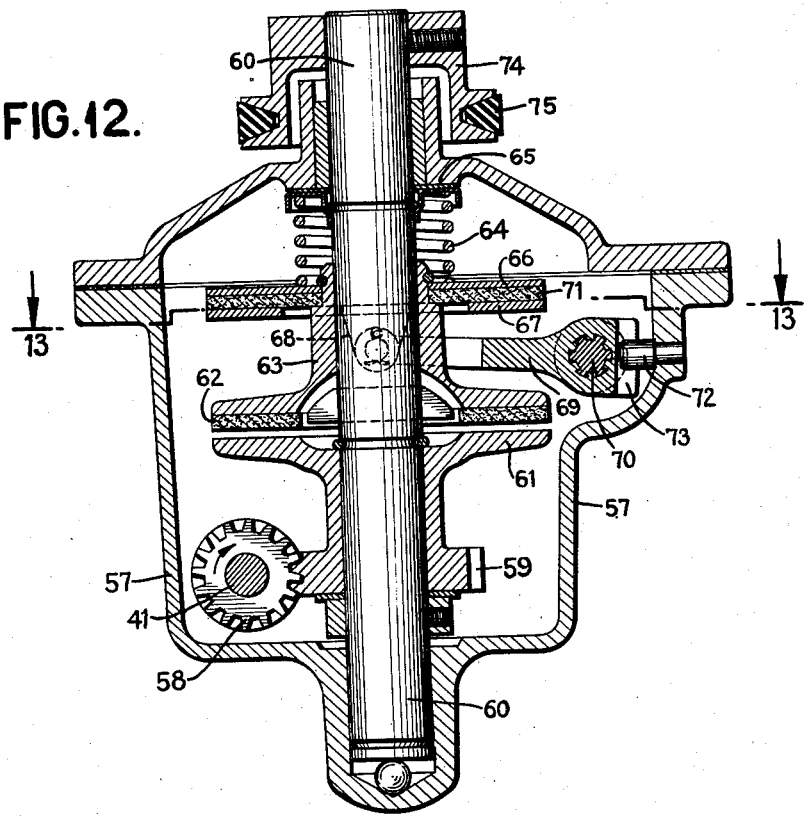
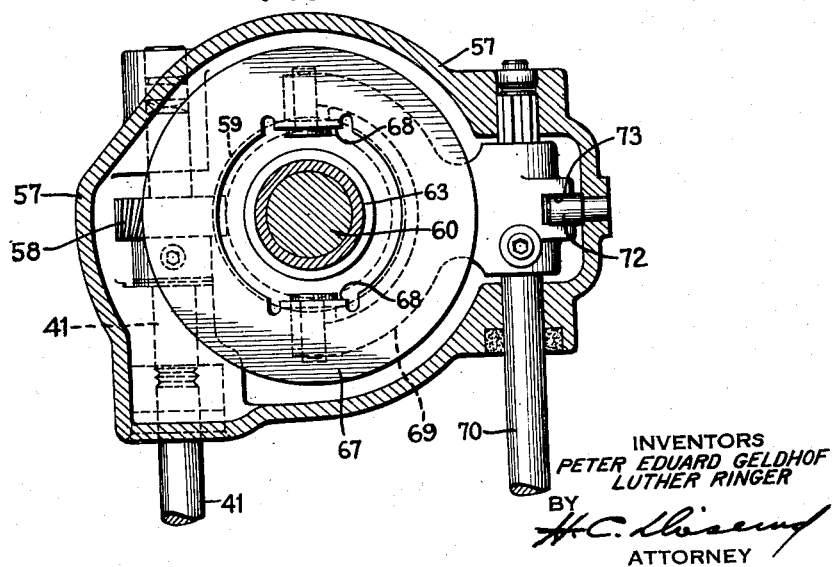
INVENTORS
PETER EDUARD GELDHOF
LUTHER RINGER
BY
ATTORNEY

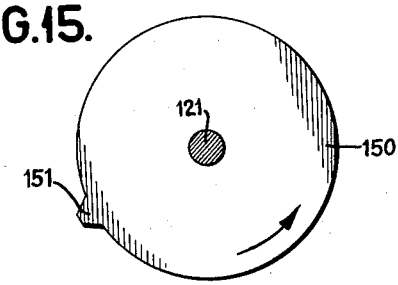
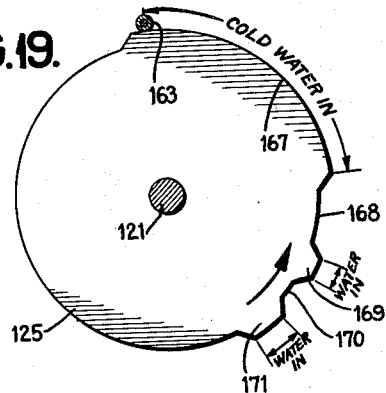
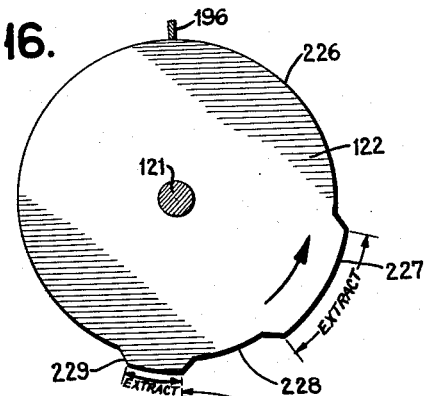
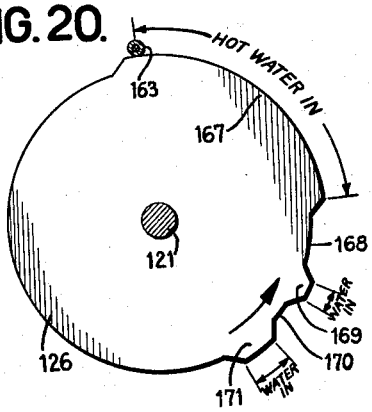
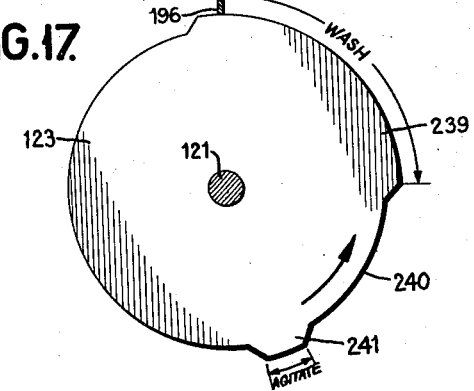
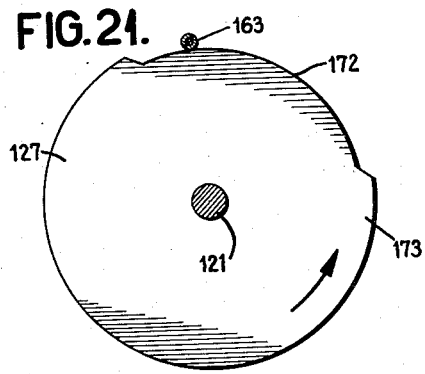
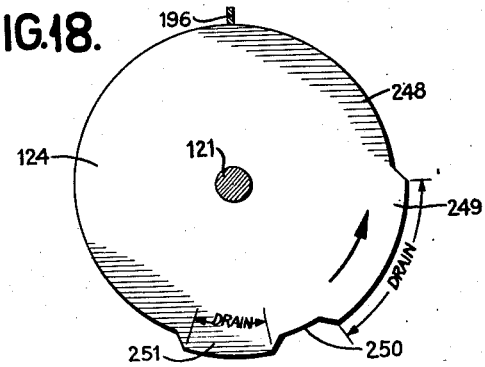

May 30, 1944.  P. E. GELDHOF ET AL  2,350,108
WASHING MACHINE AND DRIER
Filed Dec. 30, 1939  14 Sheets-Sheet 13

INVENTORS
PETER EDUARD GELDHOF
LUTHER RINGER
BY
ATTORNEY

May 30, 1944.    P. E. GELDHOF ET AL    2,350,108
WASHING MACHINE AND DRIER
Filed Dec. 30, 1939    14 Sheets-Sheet 14
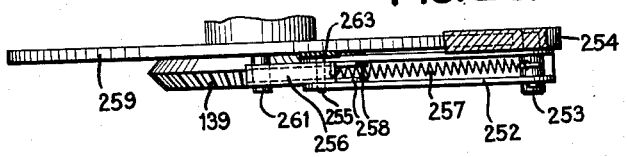
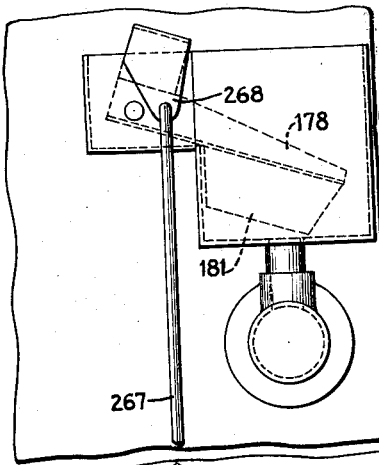
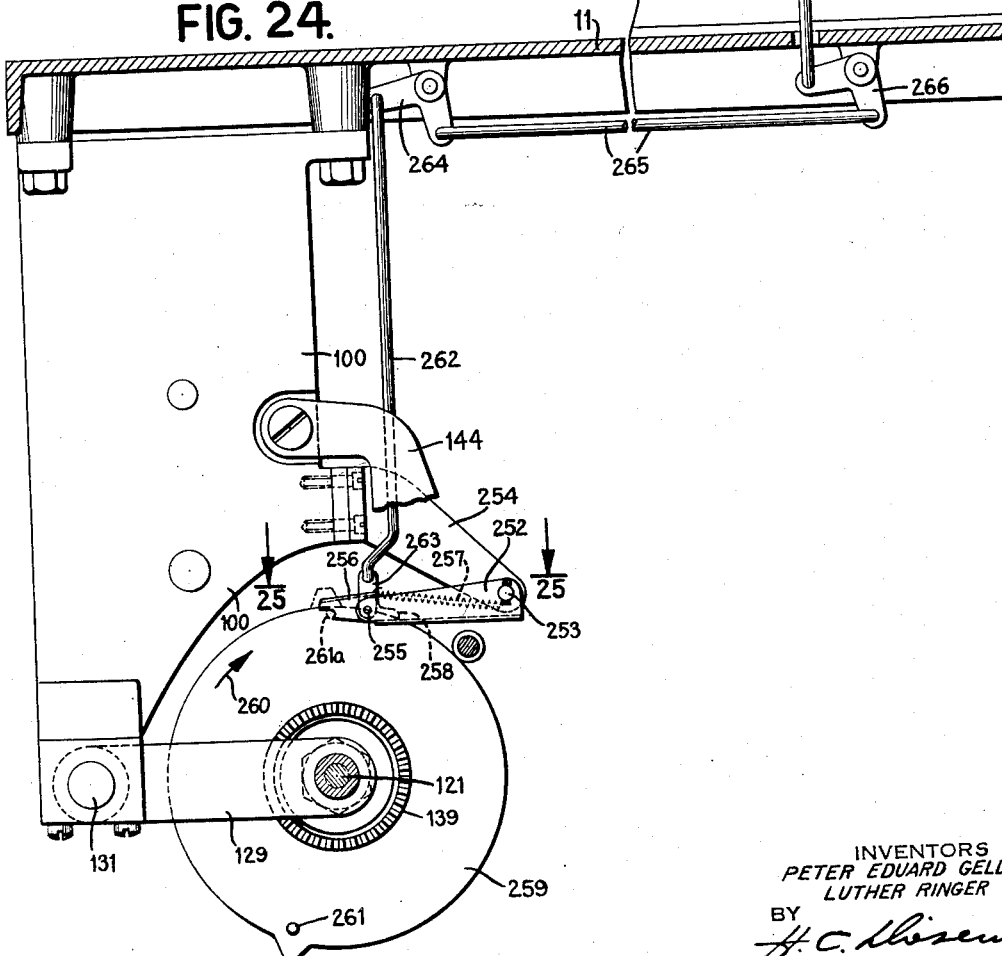
INVENTORS
*PETER EDUARD GELDHOF*
*LUTHER RINGER*
BY
ATTORNEY Patented May 30, 1944

2,350,108

UNITED STATES PATENT OFFICE 2,350,108

WASHING MACHINE AND DRIER

Peter Eduard Geldhof and Luther Ringer, St. Joseph, Mich., assignors to Nineteen Hundred Corporation, St. Joseph, Mich., a corporation of New York Application December 30, 1939, Serial No. 311,714

6 Claims. (Cl. 68—12)

This invention relates to domestic clothes washing machines and more particularly to machines capable of washing clothes and then drying them by centrifugal action.

A feature of the invention is the provision of full automatic control over the various functions of the machine. The construction is such that the operator need merely insert the clothes to be washed and dried in a suitable receptacle and then adjust and operate a control knob. The machine will automatically begin and carry out an appropriate cycle of operation to wash, rinse and dry the clothes. Upon completion of the cycle, the machine will automatically stop and the clothes may be removed at any time thereafter. They may be in condition either for immediate ironing or for further drying.

An object of the invention has been to provide simple but effective means for controlling the various operating devices of the machine. A special feature of the control means is the ability to operate and adjust it at any stage in the operation of the machine to carry out or repeat any desired portion of the complete cycle.

Other objects and advantages of the invention will appear from the detailed description of an illustrative form of the same which will now be given in conjunction with the accompanying drawings, in which:

Figure 8 is a view of the mechanism shown in Figure 6 but taken at a right angle thereto, a portion of the mechanism being shown in section.

Figure 12 is an enlarged detail view in section along the line 12—12 of Figure 5.

Figure 13 is a horizontal section along the line 13—13 of Figure 12.

Figures 15 to 21, inclusive, are face views of a series of control discs or cams embodied in the machine.

Figure 22:
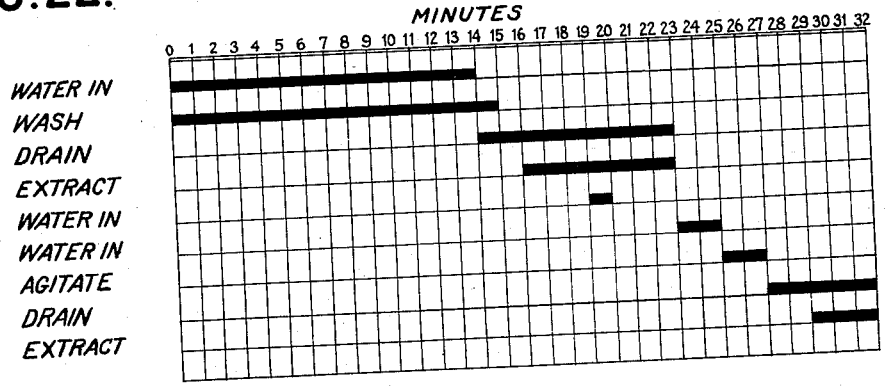

Figure 22 is a chart indicating the timing of various operations which take place during a cycle of operation of the machine.

Figure 23:
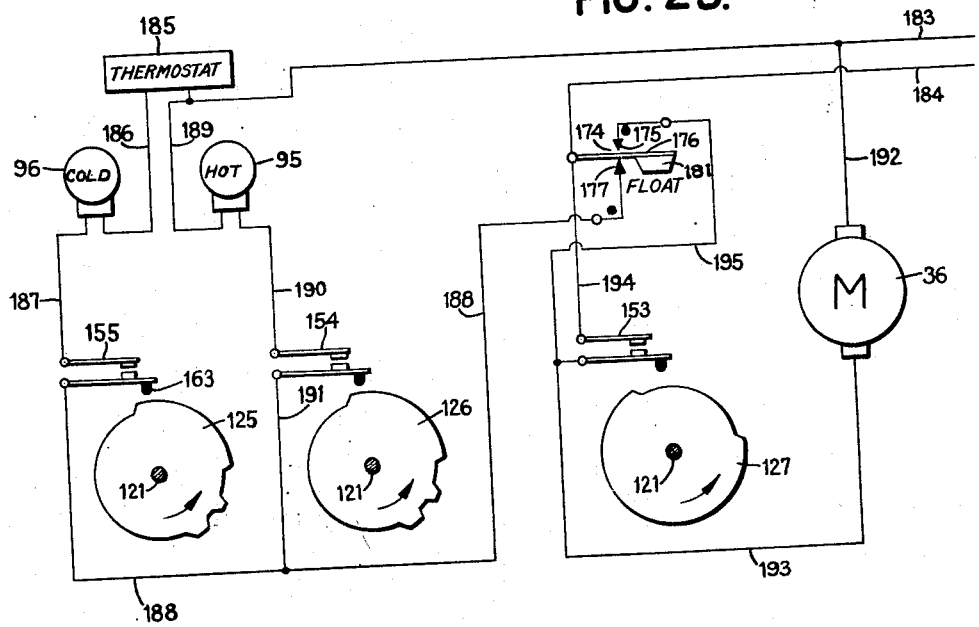

Figure 23 is an electrical wiring diagram showing the connection of various electrical devices embodied in the machine.

Figure 24 is a view partly in elevation and partly in vertical section, showing a modification of a portion of the control mechanism, and Figure 25 is a horizontal section on an enlarged scale along the line 25—25 of Figure 24.

Figure 5:
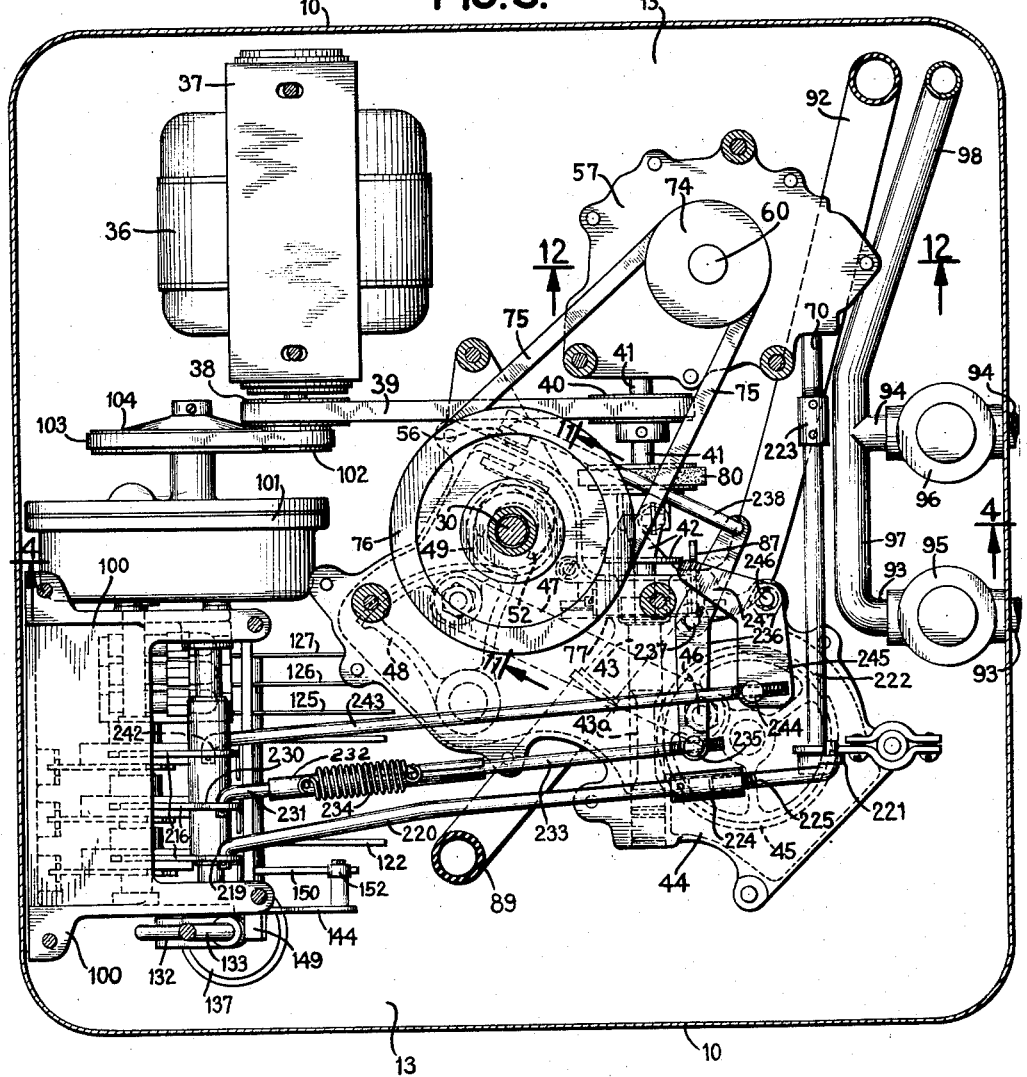
Figure 5 is a horizontal section along the line 5—5 of Figure 1.
Figures 6, 7:
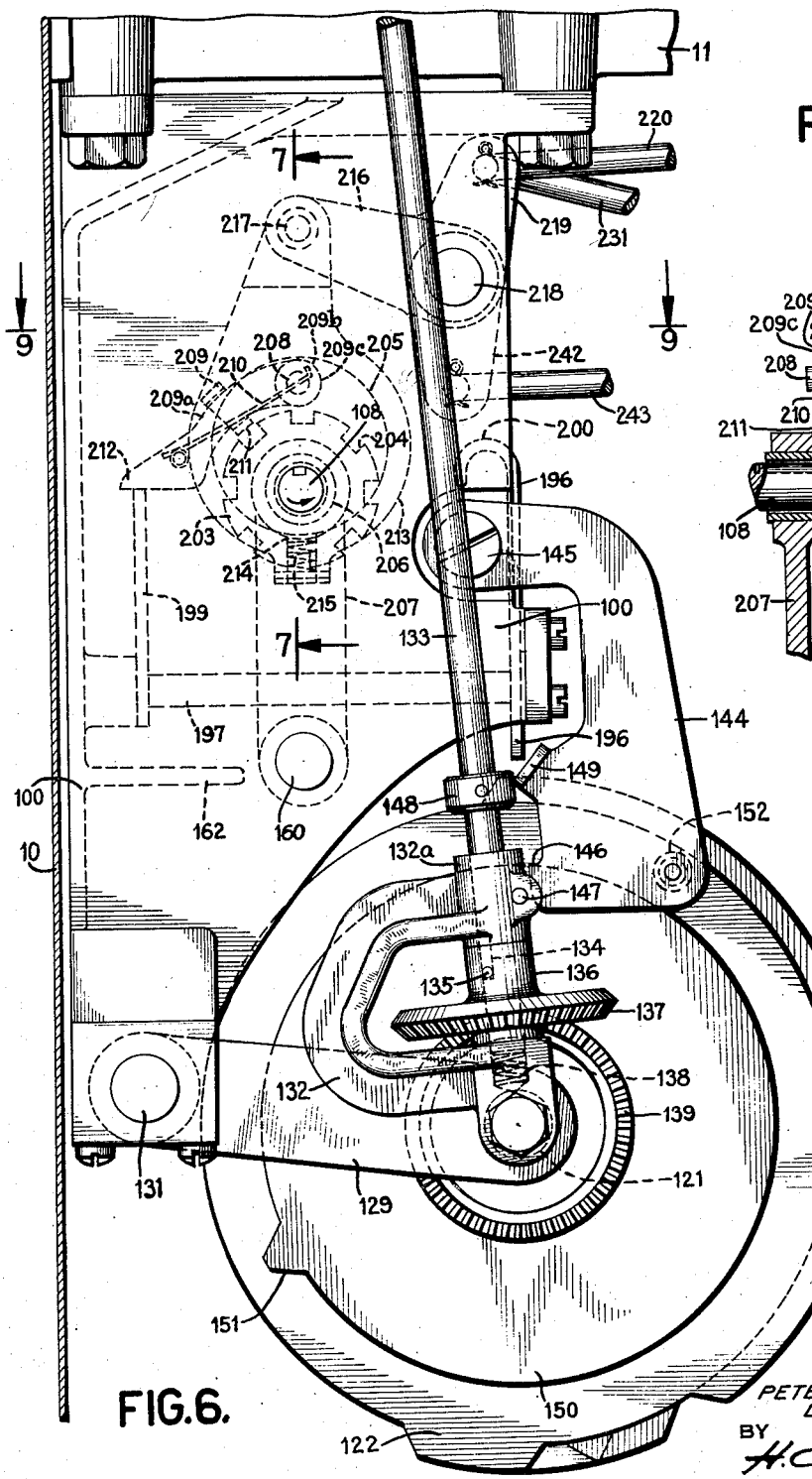
Figure 6 is an enlarged vertical section showing the mechanism illustrated in the lower left-hand corner of Figure 1.
Figure 7 is a vertical section along the line 7—7 of Figure 6.

Turning now to the drawings, the illustrative machine is preferably enclosed in a casing 10 which, as indicated in Figure 5, is preferably substantially square in cross section. It will be understood, of course, that the form of the casing may be varied within wide limits and may be of substantially any shape capable of enclosing the various portions of the machine. If desired the casing might be omitted entirely but in accordance with the modern trend, it is preferable to provide the machine with the appearance of a cabinet. A frame 11, suitably supported within the casing, may serve to divide the latter into an upper compartment 12 and a lower compartment 13.

Washing and drying devices

Figure 3:
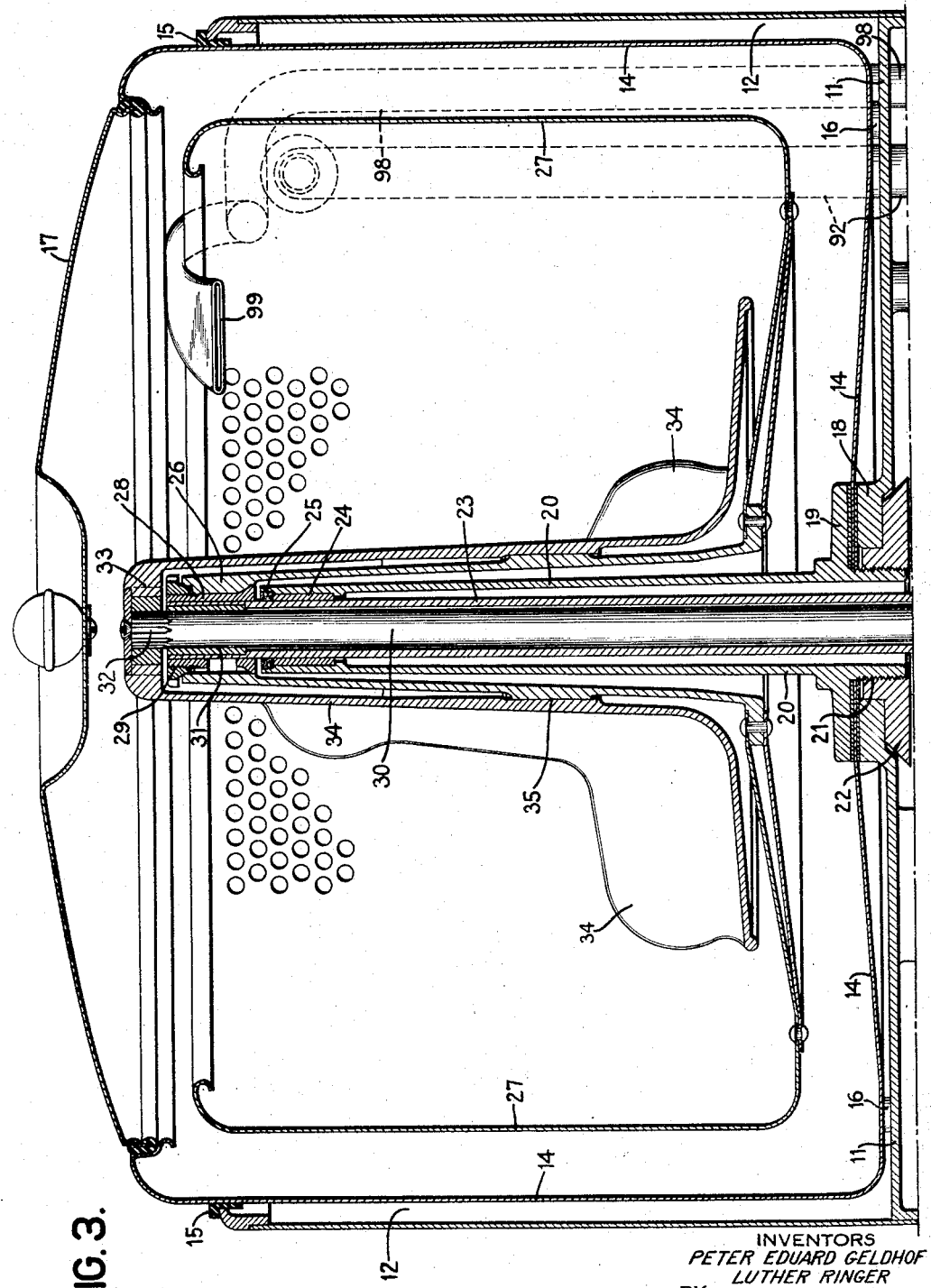
Figure 3 is a vertical, central section, on an enlarged scale, through the upper portion of the machine.

The upper compartment 12, as best shown in Figure 3, is substantially filled, except for the corners of the cabinet, by a tub 14 of suitable form and dimensions. A rubber gasket 15, between the cabinet and the tub, assists in absorbing vibrations which may be imparted to the tub in the operation of the machine and a series of rubber elements 16 between the bottom of the tub and the top of the partition 11 may similarly assist in eliminating vibrations. The top of the tub may be formed with a large circular opening adapted to be closed by a removable cover member 17 of appropriate form. The bottom of the tub is provided with a central aperture and the edge of the tub bottom surrounding this aperture is clamped between an annular boss 18 extending upwardly from the partition 11 and an annular flange 19 extending laterally from a tube 20 which extends upwardly at the center of the tub. The lower end of the tube 20, below the flange 19, is provided with threads 21 adapted to cooperate with similar threads on a casting 22 forming part of the supporting structure for the mechanism beneath the partition 11. By screwing the lower end of the tube 21 tightly into the casting 22, the bottom of the tub may be squeezed between the boss 18 and the flange 19. Gaskets may suitably be provided above and below the tub bottom to insure a tight seal.

Within the tubular column 20 there is provided a sleeve 23 which, adjacent its upper end, rotates within a bearing sleeve 24 carried by the member 20. A sealing disc 25 above the bearing sleeve assists in preventing the access of water to the outer surface of the sleeve 23 and its escape along this outer surface. Surrounding the tubular column 20 is another tubular member 26 having an outwardly extending flange at its lower end to which is suitably connected a basket 27. This basket may be of any conventional type employed for the centrifugal drying of clothes or the like. It is preferably provided with a series of perforations throughout the area of its side wall. The upper portion of the member 26 is suitably connected with the top of the sleeve 23 for rotation in unison therewith, as by means of a pair of screw-threaded members 28 and 29.

Within the sleeve 23 there is provided a shaft 30 adapted to be oscillated in a manner to be later explained. This shaft turns within a bearing 31 carried within the sleeve 23 adjacent its upper end. The upper end of the shaft 30 is splined, as indicated at 32, and it is adapted to receive a complementary formation at the upper end 33 of an agitator 34 of any conventional form. As illustrated, the agitator is preferably of the multiple vane, high center post type. It is provided with a bearing surface at 35 adapted to cooperate with a corresponding bearing surface on the outer face of the tubular member 26.

By the mechanism to be presently described, the sleeve 23 is adapted to be rotated at a high speed whenever it is desired to remove the water from the clothes by centrifugal action. At such times the agitator 34 may be simply rotated with the basket due to the frictional engagement of the parts. At other times, when the clothes are to be washed, the agitator is oscillated within the basket, the basket then being held stationary by frictional means, to be described.

It will be understood that the agitator is oscillated in the conventional way, preferably through an arc of about 240° and at a speed of about 60 complete oscillations per minute. These conditions may, of course, be varied to suit particular requirements and to bring about the most efficient washing action. Rotation of the spinner basket may also be accomplished in a conventional manner and may be at a speed sufficient either to dry the clothes to a point ready for ironing or merely to a point ready for further drying on a line or in a heated chamber, or the like. If the basket is revolved at about 450 R. P. M., the clothes will be dried to a somewhat greater extent than they are normally dried in a spinner basket of a conventional washing machine, or to which they are dried by passing them through a conventional wringer. If the basket is operated at 700 R. P. M. or a higher speed, the clothes will be dried substantially to the point at which they may be ironed. The size of the spinner basket brings about this result at a speed considerably lower than would be required for a smaller basket of the conventional type.

*Driving mechanism*

Figure 4:
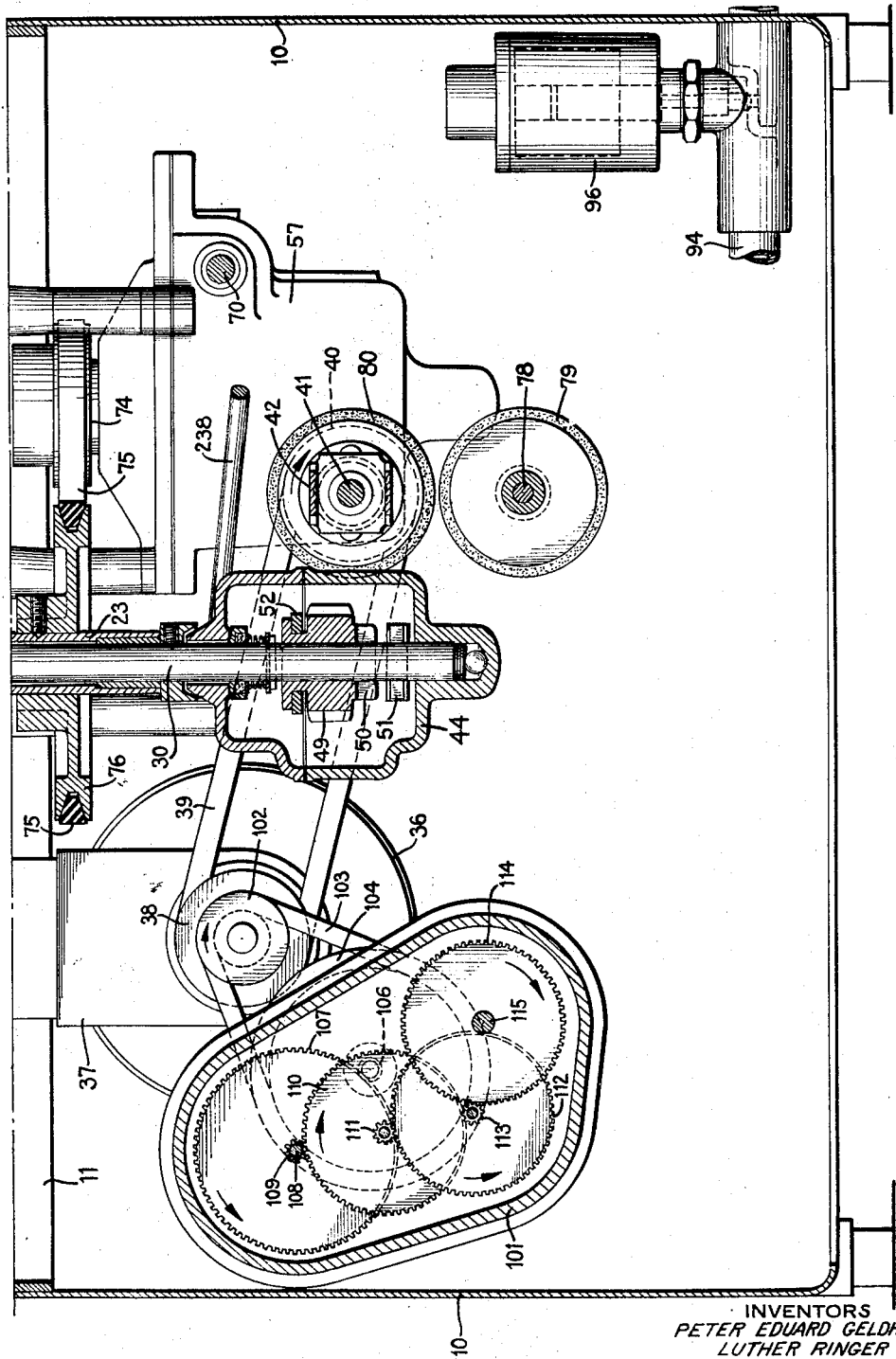
Figure 4 is an enlarged vertical section through the lower portion of the machine along the line 4—4 of Figure 5.
Figure 11:
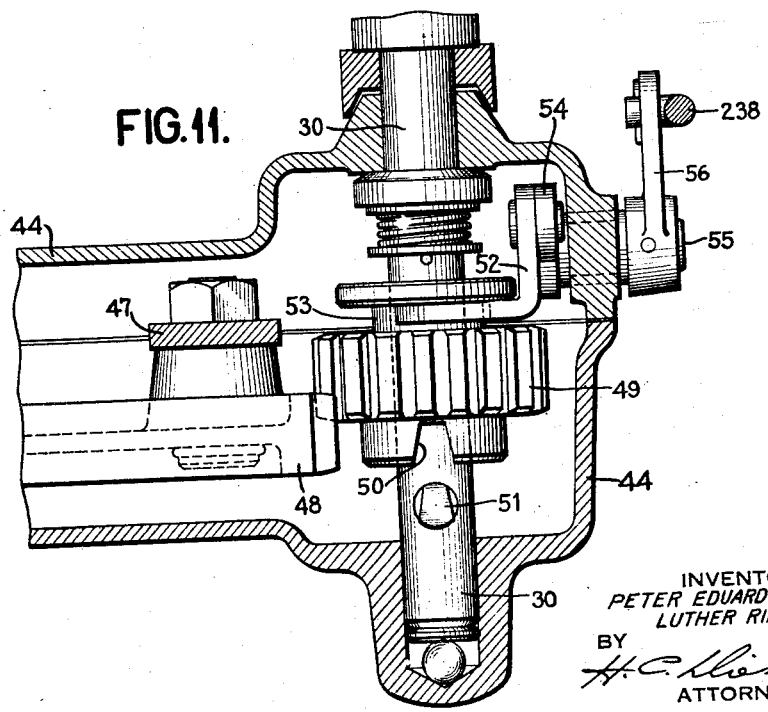
Figure 11 is an enlarged detail view in vertical section along the line 11—11 of Figure 5.

The connections for driving the basket and the agitator in the manner explained will now be described. The motive power may be supplied by a motor 36 (Figures 4 and 5) carried by a bracket 37 secured to the under surface of the partition member 11. A pulley 38, secured to the shaft of the motor, is connected by a belt 39 with a pulley 40 secured to a shaft 41. One end of the shaft 41 is connected through a universal connector 42 with a shaft 43 journaled in a gear case 44, of a type commonly employed in washing machines. At an intermediate point the shaft 43 is provided with a worm 43a which meshes with a worm-wheel 45 journaled in the gear case. An eccentric pin 46 carried by the worm-wheel is connected by a link 47 with a segment 48 pivotally mounted in the gear case. Rotation of the shaft 43 by the motor 36 will cause rotation of the worm-wheel 45 and oscillation of the rack segment 48 at the appropriate speed. This rack segment in turn meshes with a pinion 49 loosely mounted on the shaft 30 (see Figure 11). A downwardly extending collar, integral with the pinion 49, is provided with notches 50 adapted to cooperate with a pin 51 protruding at opposite sides from the shaft 30. If the pinion 49 is lowered to engage the notches 50 with the pin 51, the shaft 30 will be oscillated by the segment 48. Lowering of the pinion 49 is accomplished by a forked member 52 adapted to straddle a reduced portion 53 of a hub integral with the pinion. The forked member is pivotally carried by an arm 54 secured to a stud 55 passing through the wall of the gear casing and which has an arm 56 secured to its outer end. The arm 56, as will be later explained, is automatically rocked to bring about the engagement and disengagement of the notches 50 and pin 51.

The opposite end of the shaft 41 is journaled in a housing 57 (Figures 5, 12 and 13) suitably secured to the under side of the partition 11. Within the housing 57 a spiral pinion 58 is secured to the shaft 41 and meshes with a spiral gear 59 loosely mounted upon a shaft 60. Integral with the spiral gear 59 is a disc 61 adapted to be frictionally engaged by a surface 62 at the lower end of a slidable member 63 keyed to the shaft 60. A spring 64 acting at one end against a shoulder 65 of the housing 57 bears at its opposite end against a disc 66 connected with the member 63. Thus, the spring 64 urges the member 63 downwardly and tends to engage the friction surface 62 with the disc 61 so that the rotation of the latter will be imparted to the shaft 60. However, as the parts are shown in Figure 12, the surfaces 61 and 62 are disengaged by the action of a disc 67 having a pair of downwardly extending ears 68 pivotally connected with a forked member 69. The latter is splined to a shaft 70 which is adapted to be turned automatically in a manner to be later explained. When the shaft 70 is in the position indicated in Figure 12, the disc 67 will be held with its upper surface against a friction lining 71 carried by the disc 66. This not only serves to lift the surface 62 out of engagement with the disc 61 but also applies a braking action to the shaft 60 and tends to hold this shaft at rest. To retain the member 69 in proper position on the shaft 70, a pin 72, carried by the gear casing 57, extends into a groove 73 formed in the back of the member 69. At the upper end of the shaft 60, above the gear case 57, there is secured a pulley 74 which is connected by a belt 75 (Figures 4 and 5) with a pulley 76 secured to the sleeve 23 adjacent its lower end. In this way the rotation of the shaft 60 is transmitted to the spinner basket.

Drainage pump

Figure 14:
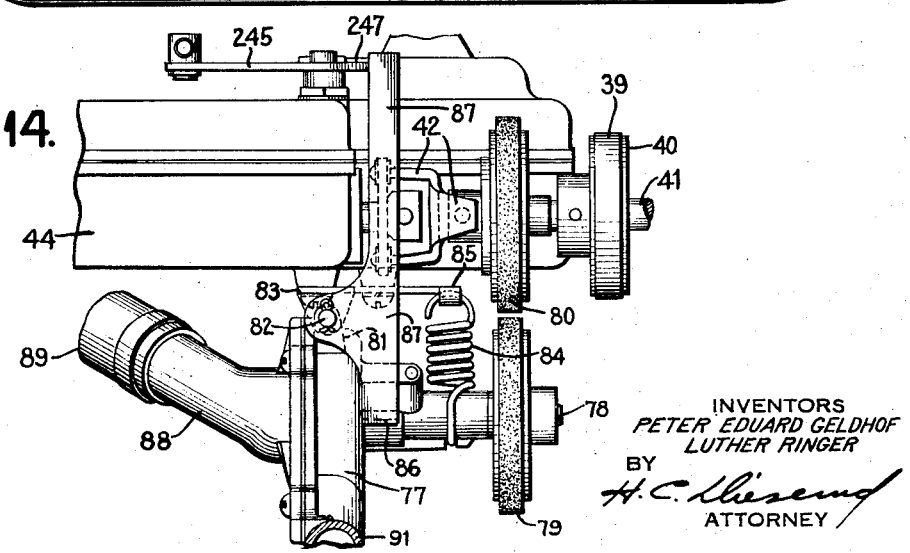
Figure 14 is an enlarged detail in elevation of the pump and operating devices.

Another member which is driven by the shaft 41 is a pump 77 (Figure 14) employed in the draining of the tub at desired periods in the cycle of operation of the machine. This pump may be of any conventional, centrifugal impeller type, the impeller (which is not shown) being carried by a shaft 78. Adjacent the outer end of this shaft, which extends beyond the casing of the pump, there is secured a friction wheel 79 adapted to engage the periphery of another friction wheel 80 carried by the shaft 41 (see also Figs. 4 and 5. The pump unit is pivotally connected with the frame of the machine beneath the gear case 44. For this purpose a pair of upstanding ears 81, integral with the casing of the pump, is adapted to receive a pivot pin 82 carried by a bracket 83 secured to the under side of the gear case 44. A spring 84, having one end attached to a sleeve portion of the pump casing which surrounds the shaft 78 and having its other end attached to an extension 85 of the bracket 83, tends to rock the pump unit counter-clockwise (Fig. 14) to engage the friction wheels 79 and 80. However, the action of the spring 84 is resisted at times by a finger 86 of a lever 87 pivoted about the pin 82. Finger 86 engages a portion of the pump casing and serves to rock the latter about the pivot 82 against the action of spring 84 whenever the upper end of the lever 87 is forced in a clockwise direction (Fig. 14) by the control mechanism, which will be later described.

The intake side of the centrifugal pump 77 has a pipe extension 88 which is connected by a hose 89 with a drain member 90 provided in a slightly depressed well in the bottom of the tub 14. Whenever the pump is driven through the engagement of the friction wheels 79 and 80, the water will be rapidly withdrawn from the tub and will be discharged through the outlet 91 of the pump to a hose 92, which may be suitably connected with the sewer system of the house or other building in which the washing machine is installed. As shown, the hose 92 is carried up to a point slightly above the desired high water level in the tub to prevent the discharge of water except when the pump is operated or when the tub may become filled too high. The hose may be disconnected whenever it is desired to completely drain the machine.

Water inlet connections

Water is supplied to the machine through pipes 93 and 94, which may be hot and cold water inlets, respectively. These pipes are permanently connected with the water system of the house or other building in which the machine is installed. Solenoid-controlled valves 95 and 96 are provided in the lines 93 and 94, respectively, within the cabinet of the machine. These solenoid-controlled valves may be of conventional construction and are adapted for electrical operation by the energization of the solenoids. It will be understood that the armatures of the solenoids serve to operate the valves to permit the introduction of hot and cold water into the machine. This will be explained later. One of the valves is preferably controlled by a thermostat, as will be more fully explained later, which may be appropriately adjusted to regulate the temperature of the water introduced into the machine. The thermostat is made responsive to the water in the machine and regulates, for example, the amount of cold water that is introduced.

The pipes 93 and 94, within the machine, are connected with a branched member 97 which serves to bring the hot and cold water together and is in turn connected with a pipe or hose 98 which delivers the water upwardly along the side of the tub, preferably at one of the corners of the cabinet of the machine. This pipe or hose may project through the tub 14 near the top of the cabinet and may then be carried over the top of the basket 27 so that its discharge end 99 will direct the water into the interior of the basket. If desired, the end 99 of the hose may be flattened or otherwise formed to provide a spray or it may be arranged to direct the water against the vanes of the agitator 34, which will then serve to produce a spray.

Automatic control mechanism

Figure 8A:
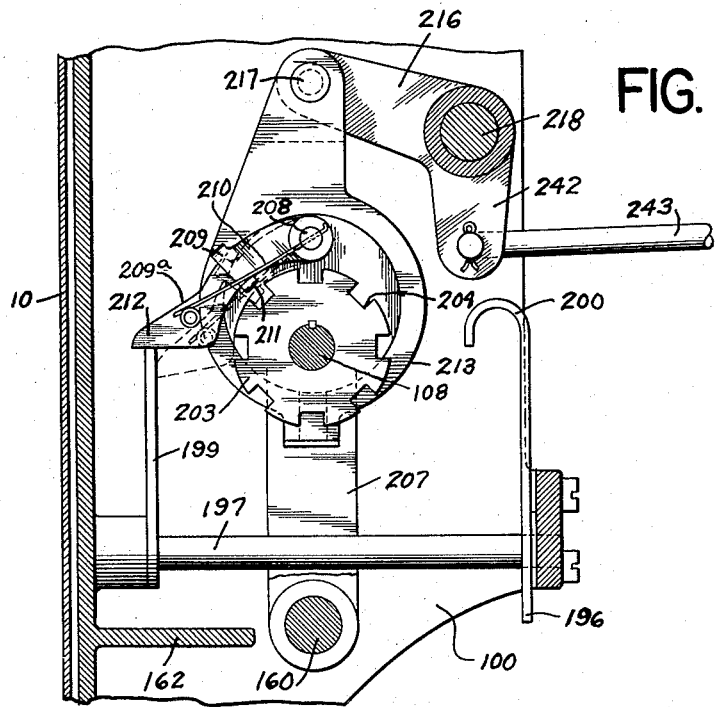
Figure 8A is a sectional view along the line VIIIA—VIIIA of Figure 8 showing a side view of one of the half revolution clutches.
Figure 8B:
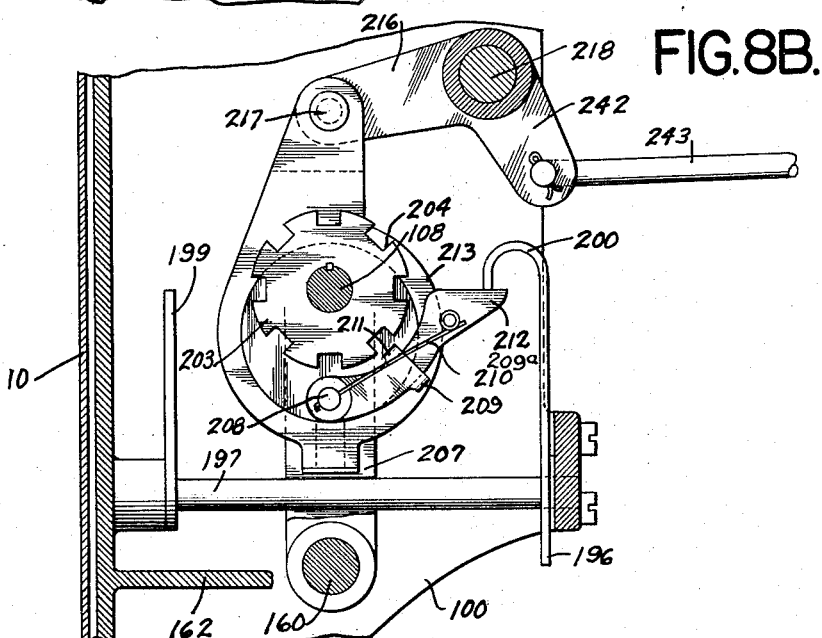
Figure 8B is a view similar to Figure 8A, but shows the position of the half revolution clutch after it has been rotated through an angle of 180°.

The control mechanism (Figures 5 to 10, inclusive) is carried by a frame 100 which is bolted or otherwise secured to the under side of the partition 11. At one side of the frame 100, between the latter and the motor 26 (Figure 5) is a gear case 101 which encloses a series of reducing gears (see also Figure 4). The shaft of the motor 36 carries a second pulley 102 beyond the pulley 38 previously mentioned. This second pulley is connected by a belt 103 with a pulley 104 secured to a shaft 105 (Figure 8), having at its inner end, within the casing 101, a broadtoothed pinion 106. This pinion meshes with a gear 107 secured to a shaft 108 which extends into and through the frame 100, being journaled in suitable bosses on this frame. While some reduction takes place between the shaft 105 and shaft 108, this is only a part of the total reduction provided by the gearing within the case 101. As will be explained hereinafter, the shaft 108 transmits the motive power to various controlled devices.

Figure 1:
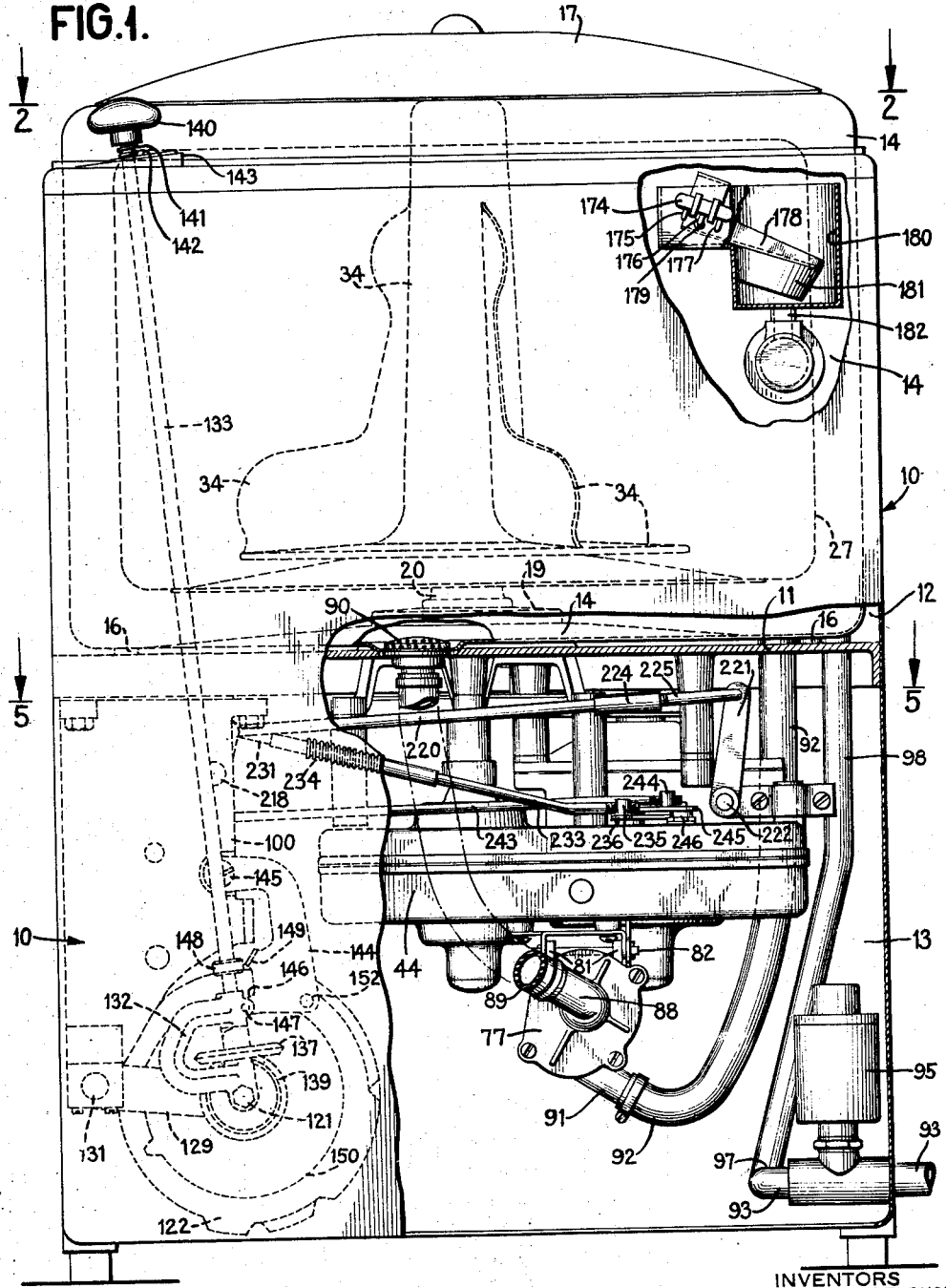
Figure 1 is an elevational view of a combined washing machine and drier, embodying the invention, portions of the casing and other parts of the machine being broken away to disclose the construction more clearly.
Figure 2:
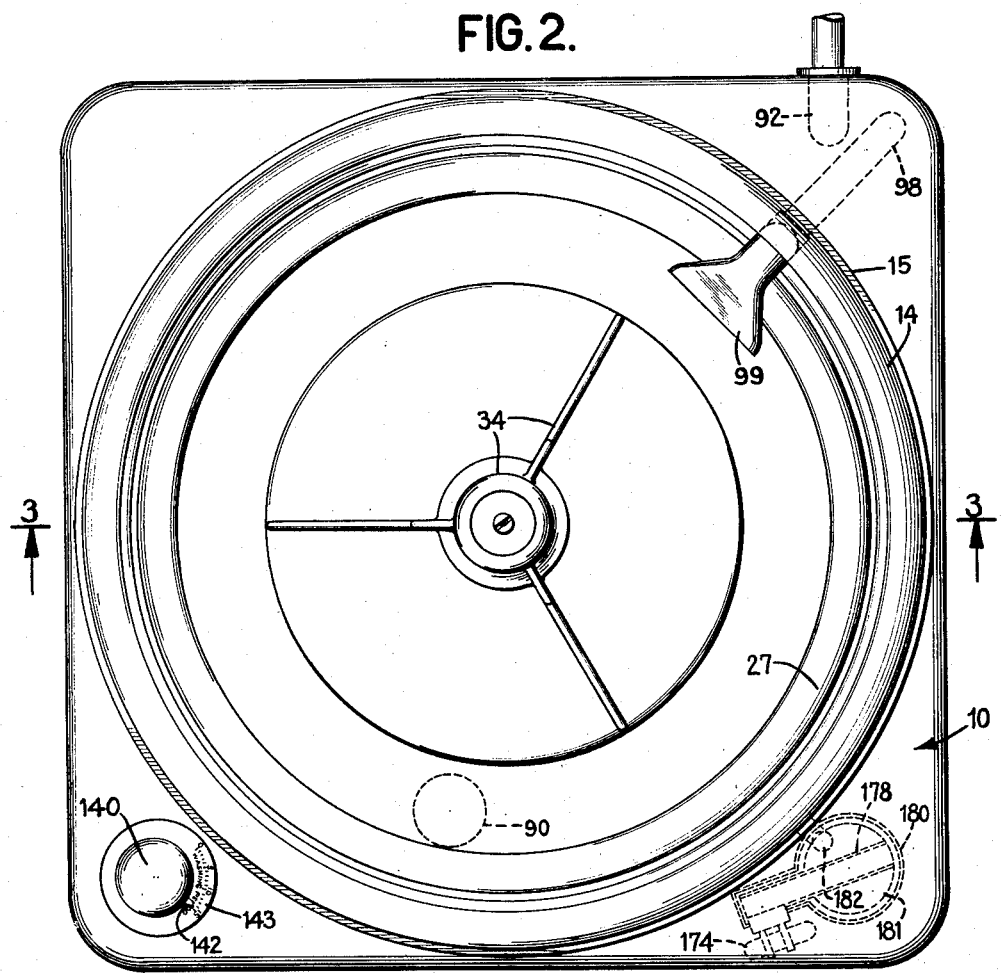
Figure 2 is a plan view of the machine with the cover removed.

Integral with the gear 107, or otherwise secured to the shaft 108, is a pinion 109 which meshes with a gear 110 having secured thereto, or otherwise connected therewith, a pinion 111. This pinion in turn meshes with a gear 112 having connected therewith a pinion 113 which meshes with a gear 114 secured to a stub shaft 115. The stub shaft extends through a wall of the casing 101 and carries a pinion 116 which is capable of turning upon the shaft 115 but is normally driven by the shaft through a pair of friction discs 117 and 118 on opposite sides of the pinion. A spring 119 serves to urge the disc 118 against the pinion 116 and the latter against the disc 117, thereby creating a desired amount of friction. Beneath the pinion 116, and normally spaced therefrom but adapted to be lifted into mesh therewith, is a large gear 120 secured to a shaft 121. This shaft carries a series of control discs or cams 122, 123, 124, 125, 126 and 127, which are retained on the shaft in appropriate, spaced relation by means of spacing collars 128. The discs are keyed, or otherwise secured, to the shaft so as to rotate therewith. The ends of the shaft 121 are mounted in arms 129 and 130 (Figures 1, 6 and 8), pivoted upon studs 131 carried by the frame 100. A yoke 132, pivotally connected with the shaft 121 provides a bearing 132a for a rod 133 which extends radially upwardly from the shaft 121 and is adapted to both rotate and slide within the bearing 132a. Rod 133 has a cut-out portion 134 adapted to receive a pin 135 passing through a hub 136 of a bevel gear 137. This construction is such that rotation of the rod 133 will cause a corresponding rotation of the bevel gear 137 but the rod 133 may be shifted axially within the hub 136 to a limited extent. The axial movement of the rod is resisted by a spring 138 provided in a socket in the yoke 132 and arranged to engage the lower end of the rod. Secured to the shaft 121 is a bevel gear 139 which meshes constantly with the gear 137. Through these gears the shaft 121 and the various control discs mounted thereon may be turned manually to any desired position by the simple rotation of the rod 133. At its upper end the rod is provided with a knob 140 to facilitate its manual rotation. A spring 141, coacting between the top of the machine housing and the under side of the knob, tends to elevate the knob and the rod 133 and partially, but not completely, counter-balance the weight of the control mechanism carried by the arms 129 and 130. However, in spite of the spring 141, the weight of the parts is sufficient to cause the control mechanism and the rod 133 to drop into the position indicated in Figures 1 and 6 whenever the parts are released. A pointer 142 (Figure 2) associated with the knob cooperates with a scale 143 on the top of the cabinet to indicate the adjustment of the control mechanism. In the illustrative example, the machine is designed for a variable washing period up to fifteen minutes. Obviously, this might be extended, if desired, to a greater period. By appropriate adjustment of the knob 140, the length of the washing period may be varied at will.

In the operation of the machine the knob 140 will first be turned to the desired position and the rod 133 will then be lifted, thereby raising the various control discs and other associated parts. These parts are held in their raised position by means of a latch 144 pivoted at 145 upon the frame 100. A shoulder 146 on the latch is adapted to swing beneath a pin 147 carried by the yoke 132 as this pin is raised above the shoulder. Gravity is sufficient to rock the latch into engagement with the pin, although, if desired, a spring might be employed in lieu of or to supplement the action of gravity. A collar 148 secured to the rod 133 normally engages the lower edge of a transversely projecting finger 149 on the latch. However, when the rod 133 is lifted in the manner explained, the collar 148 will be raised above the finger 149 and will permit the shoulder 146 of the latch to engage the pin 147. As will be explained more fully hereinafter, the lifting of the rod 133 automatically initiates the operation of the machine. Should it be desired at any time to discontinue such operation before it is automatically stopped, in the manner to be explained, it is simply necessary to slightly depress the rod 133, with respect to the yoke 132, against the action of the spring 138. The collar 148 will, at this time, engage the finger 149 and swing the latch outwardly, thereby permitting the control shaft and discs to drop by gravity. This will immediately arrest the operation of the machine.

For the automatic stopping of the machine upon the completion of a cycle of operation, a disc 150 is provided, this being secured to the shaft 121 and rotated with the shaft upon both its manual adjustment and its automatic operation through the gear 120, as previously explained. In the manual adjustment of the shaft, a projection 151 of the disc 150 will be carried a desired distance away from a roller 152 projecting laterally from the latch 144. The location of the projection 151 at the commencement of the operation of the machine will be determined by the adjustment of the knob 140. As the machine carries out its cycle of operation, the projection 151 will eventually strike the roller 152 to disengage the shoulder 146 of the latch from the pin 147 and stop the operation.

Figure 9:
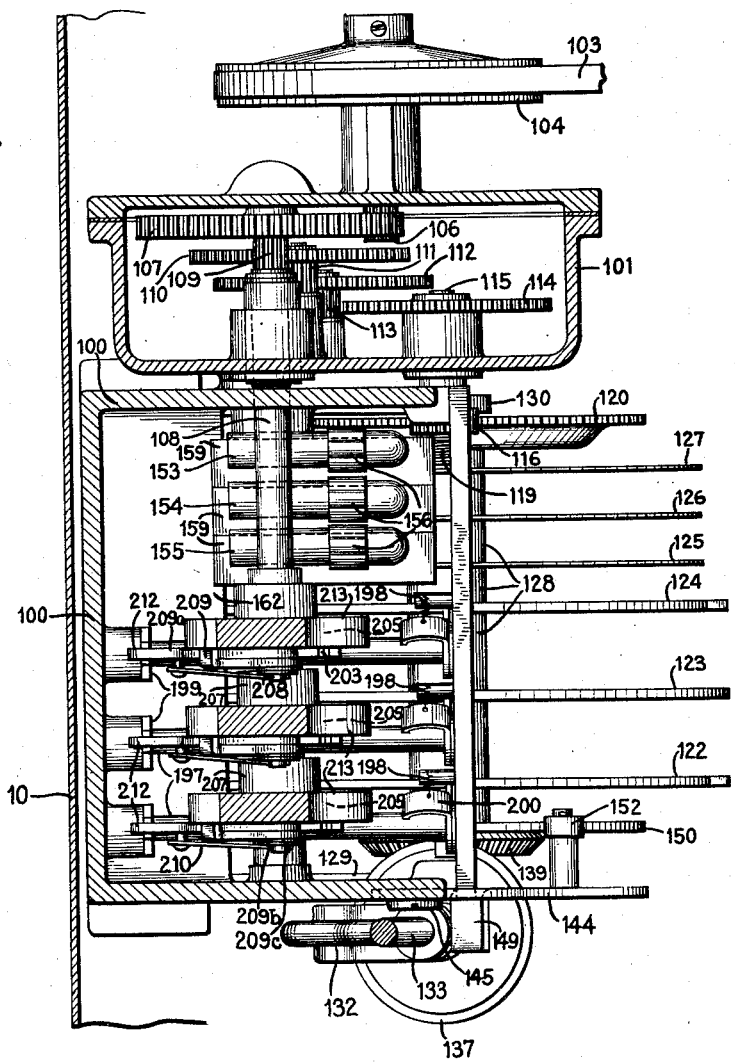
Figure 9 is a horizontal section along the line 9—9 of Figure 6.
Figure 10:
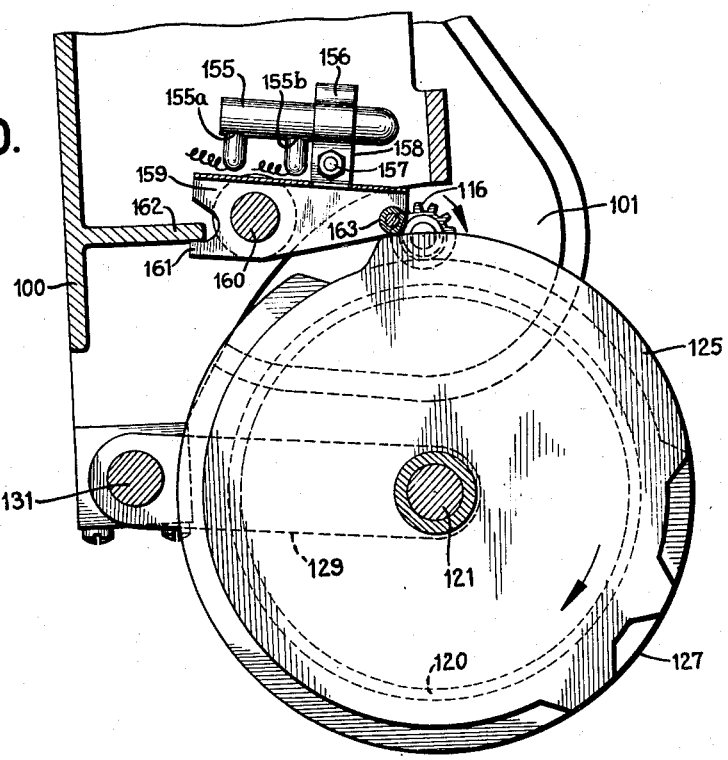
Figure 10 is a vertical section along the line 10—10 of Figure 8.

As will be explained more fully hereinafter, the motor 36 and the various driven parts of the machine will not be set in operation immediately upon the lifting of the control knob. These parts will be automatically set in operation at the appropriate point in the cycle. However, upon the lifting of the control knob, certain electrical circuits are made effective and these control the commencement of the cycle of operation of the machine. Three of the switches which enter into the circuits mentioned are indicated in Figures 8 and 9 and designated 153, 154 and 155. These switches are of identical construction and are mounted in the same way. Therefore, a description of one will suffice for the group. Referring to Figure 10, the switch 155 is shown as of the conventional mercury type. It consists simply of a tube having a quantity of mercury therein which, when the tube is tilted in one direction from the horizontal as shown in Figure 10, will cause the mercury to shift out of engagement with at least one of the contacts 155a and 155b. When the tube is rocked in the opposite direction, however, the mercury will bridge the two contacts and complete the circuit.

For the purpose of rocking the switch into the desired position, it is retained by a clamp 156 secured by a bolt 157 to an upstanding ear 158 of a supporting member 159 freely mounted upon a rod or shaft 160. The finger 161 on the supporting member is arranged to engage a projection 162 on the main frame to limit the movement of the parts in a clockwise direction (Figure 10). Normally, the switch and its support will tend to assume this position by gravity, although if desired a spring might be employed to urge the parts into this position. A roller 163, at the forward end of the support 159, is adapted to cooperate with one or another of the control discs 125, 126 and 127 carried by the shaft 121. The form of these control discs, as provided in the illustrative machine, is indicated in Figures 19, 20 and 21. The discs 125 and 126, which control the switches 155 and 154, respectively, are of identical form, these discs being for the purpose of controlling the solenoids 95 and 96 which admit the hot and cold water into the tub. Each of these discs has a high portion 167 which is normally disposed beneath the roller 163 of the switch supporting member regardless of the washing period determined by the adjustment of the knob 140. In the illustrative machine the high portion 167 will cover a period of at least fifteen minutes so that if a washing period of any amount from zero to fifteen minutes is chosen, the portion 167 of each of the discs 125 and 126 will engage its respective roller 163 and will rock the related switch upon the lifting of the control knob in the manner previously explained. This, as will be later explained, closes suitable circuits through solenoids 95 and 96. At the end of the selected washing period the discs 125 and 126 will have been turned to positions in which depressed portions 168 of their peripheries will be beneath the rollers 163. This will cause the rocking of the associated switches back to the open position indicated in Figure 10. Subsequently a projection 169 will be brought into engagement with the rollers 163 and will again rock the switches into closed position. The switches are so held but for a brief period and are then rocked into open position as the depression 170 of the discs is carried beneath the roller 163. Later, a projection or high portion of each disc 171 serves to again close these switches for a brief period, after which the switches are rocked into open position and so remain for the balance of the cycle.

The control disc 127, which operates the switch 153, is of different form. Switch 153, as will be explained, is in the circuit which controls the operation of the motor 36. Disc 127 has a depressed portion 172 normally positioned beneath the roller 163 regardless of the length of the washing period selected. However, the construction is such that before the end of the washing period a high portion 173 of the disc 127 will be carried beneath the roller 163. The purpose of this is to maintain in closed condition a circuit through the motor which previously will have been closed by another switch operated by a float associated with the washing machine tub, as will now be explained.

A switch is provided which is controlled by a float responsive to the height of the water in the tub 14. This may also be a mercury switch, 174 (Figs. 1 and 2), but of a slightly different type from the mercury switches previously explained. It is adapted to close either of two circuits rather than merely open and close a single circuit. For this purpose it is provided with three contacts 175, 176 and 177, the arrangement being such that the mass of mercury spans two of these contacts to close a circuit either between contacts 175 and 176 or between contacts 176 and 177. When the switch is in its intermediate position, the mercury will span all three contacts and close both circuits. The mercury tube may be mounted in any suitable way upon an arm 178 pivoted at 179 in a chamber 180 mounted in one of the corners of the cabinet near the top of the latter. A float 181 attached to the free end of the arm 178 is adapted to rock the arm in response to the level of the water in the chamber 180. This chamber is in comunication with the interior of the tub 14 through a passage 182 so that the level of the water in the chamber 180 will correspond with that in the tub.

Referring now to the wiring diagram of Figure 23, the machine is permanently connected to a source of electricity through conductors 183 and 184. The line 183 is connected with one side of a thermostat 185 which may, if desired, be adjustable to determine the temperature at which it is adapted to open and close a circuit. The opposite side of the thermostat is connected by a line 186 with the cold-water-controlling solenoid 96. Thus, if the thermostatic element of the member 185 is located within the tub, or at some point where it is responsive to the temperature of the water in the tub, it will serve to open or close the circuit through the solenoid 96, depending upon the temperature of the water. This circuit is otherwise completed from the solenoid through a line 187, the switch 155 (whenever the disc 125 is raised and has a high portion presented to the roller 163), a line 188 and contacts 177 and 176 of the float controlled switch to the opposite side of the line 184. A branch line 189 from the line 183 is connected with the solenoid 95 which operates the hot water valve. This valve is operated independently of the thermostat, although, obviously, it might be controlled by another thermostat or the thermostat 185 might be provided in this line rather than in the cold water control line. The opposite side of the solenoid 95 is connected by a line 190 with one contact of the switch 154, the other contact of which is connected by a line 191 with the line 188. The circuit is completed to the opposite side 184 of the power line in the same manner as previously explained. It will be noted, incidentally, that the circuits through the solenoids 95 and 96 are opened whenever the float is raised to break the connection between the contacts 176 and 177. Therefore, as soon as the water is filled to the proper level within the tub 14, both the hot and cold water valves are closed.

Another branch line 192 from the power line 183 is connected with the motor 36, the opposite side of which is connected with one contact of the switch 153. This switch is connected by a line 194 with the contact 176 of the float controlled switch and also directly to the opposite side 184 of the power line. The line 193 is also connected directly by a line 195 with the contact 175 of the float-controlled switch. In this way the circuit through the motor 36 may be closed either by the closing of the switch 153 or by the closing of the circuit through the contacts 175 and 176. Therefore, the motor will be set in operation as soon as the tub is filled with water and the float raised to close the circuit through contacts 175 and 176. Subsequently, when water is withdrawn from the tub by the pump 77, the motor 36 is maintained in operation through the closing of the switch 153.

For the purpose of controlling the operation of the agitator, the rotation of the spinner basket and the operation of the pump, three similar mechanisms are employed. These mechanisms are, in fact, identical in the construction of the parts which are directly associated with the control discs 122, 123 and 124 and are operated thereby. Therefore, a description of one of these mechanisms will suffice for the entire group.

Referring now particularly to Figures 5, 6, 7, 8, 8A, 8B and 9, each of these mechanisms includes an arm 196 secured to a rock shaft 197, journaled in suitable bearings in the frame 100. The lower end of the arm 196 is in the path of the related one of the discs 122, 123 and 124. When these discs are raised by the lifting of the knob 140, the high or projecting portions of the related disc will engage the end of the arm 196 and rock it and its connected shaft 197. When a lower or depressed portion of the disc comes opposite the arm, the latter will be rocked back again into its normal position by springs 198. Adjacent the opposite end of the shaft 197 an arm 199 is provided. The upper end of this arm serves as an abutment for a pawl, to be presently described. A gooseneck portion 200 of the arm 196 provides at its lower end a similar abutment for the same pawl.

On the shaft 108, which, as previously explained, is rotated at a greater speed than the shaft 121, there is secured a clutch disc 203 for each of the three control units. These discs are provided with notches 204 in their peripheries. Adjacent each disc 203 is mounted an eccentric 205 rotatable upon a sleeve 206 surrounding the shaft 108. For the purpose of retaining the sleeve 206, an arm 207 carried by the rod 160 is provided. On a pin 208 projecting from one side of the eccentric 205, there is pivotally mounted a pawl 209 and a pawl lever 209a urged in a counter-clockwise direction by a spring 210. This spring serves to urge a tooth 211 on the pawl into engagement with one or another of the notches of the clutch disc 203. It will be understood that the pawl has a projection extending into the plane of the pawl lever at either side of the latter, a slight clearance being provided to permit limited, independent movement of the pawl and lever. A spring washer 209b and a second washer 209c, together with the spring 210, serve to provide appropriate friction between the pawl and lever so as to eliminate ratcheting when the pawl is disengaged from the clutch disc in the manner to be explained.

Engagement of the tooth 211 in one of the notches 204 is normally prevented by the engagement of the end 212 of the pawl lever 209a with the upper end of the arm 199. When the arm 199 is rocked by the engagement of a high portion of the related control disc with the arm 196, the spring 210 will engage the pawl tooth with the next notch in the clutch disc and will cause the eccentric to be turned with the shaft 108. This rotation will continue until the end 212 of the pawl lever strikes the lower end of the gooseneck 200 of arm 196, at which time the tooth 211 will be withdrawn from the clutch disc and the eccentric will be arrested. When the control disc (122, 123 or 124) rotates further, until a low or depressed portion of its periphery is brought opposite the lower end of arm 196, the latter will be returned by the spring 198 to its normal position, thereby disengaging the lower end of the gooseneck 200 from the tail 212 of the pawl lever and permitting the tooth 211 of the pawl to again engage a notch in disc 203 and causing the eccentric to be rotated another half revolution until the tail of the pawl again strikes the upper end of the arm 199.

An eccentric strap 213 surrounds the eccentric 205 and a small disc 214 mounted within the eccentric strap is urged by a spring 215 against the periphery of the eccentric to serve as a brake and prevent the eccentric from being rotated by the spring 210. The upper end of the eccentric strap is bifurcated and adapted to receive between the bifurcations one end of an arm of a bell-crank 216 pivotally connected with the eccentric strap by a pin 217 and rockably mounted on a rod 218 carried by the frame.

The bell-crank associated with the control disc 122 has its upstanding arm 219 connected by a rod 220 with an arm 221 secured to a rock shaft 222 suitably supported by the frame of the machine. This rock shaft is connected by a coupling 223 of any suitable character with the end of the shaft 70, previously described, which when rocked in one direction serves to cause rotation of the spinner basket and when rocked in the opposite direction serves to arrest rotation of the spinner basket. Preferably the rod 220 is formed in two parts so as to make its length readily adjustable. One of the parts may have a socket portion 224 secured thereto while the other part, 225, may have screw-threads at its end adapted to be turned to any desired extent into threads within the socket.

Referring to Figure 16, which illustrates the form of the disc 122 in the illustrative machine, it will be seen that during the initial portion of the cycle of the machine, a low or depressed part 226 will be opposite the end of lever 196 and there will, therefore, be no operation of the related half revolution clutch. Eventually, however, a high portion 227 of the disc will be brought into engagement with the arm 196 and the clutch will be operated to bring about operation of the spinner basket. This will continue until a depressed part 228 is brought beneath the arm 196, at which time the rotation of the basket will stop. After another brief period, another high portion 229 of the disc will again operate the arm 196, and hence the half revolution clutch, to cause the operation of the spinner basket. On completion of a brief interval of operation, the basket will again be stopped and remain arrested throughout the balance of the cycle of the machine.

In a similar way the bell crank 216 related to the disc 123 has its upstanding arm 230 connected by a rod 231 with the agitator control devices. Rod 231 preferably has a socket portion 232 secured thereto, which telescopically receives the end of another rod 233. A spring 234, connected between pins on the socket 232 and on the rod 233, normally tends to draw the latter into the socket. Rod 233 has screw-threaded engagement with a pin 235 carried by a two-armed lever 236 pivoted at 237 on the frame of the machine. The opposite arm of this lever is connected by a link or rod 238 with the arm 56 which operates the agitator clutch pinion 49.

Referring to Figure 17, it will be seen that the disc 123 has a high portion 239 normally aligned with the related arm 196 so that when the control knob 140 is raised, the linkage just described will cause engagement of the agitator clutch, and when the motor 36 is subsequently set in operation the washing action will commence. After an appropriate washing period a depressed portion 240 of the disc 123 will be brought opposite the arm 196 and will cause the agitator clutch to become disengaged. At a subsequent period in the cycle, a projecting portion 241 of the disc again causes engagement of the agitator clutch and causes operation of the agitator during a rinsing period. Following this, the agitator remains idle during the rest of the cycle.

The bell-crank 216 associated with the control disc 124 is inverted and has a downwardly extending arm 242 connected by a rod 243 with a stud 244 carried by an arm of a bell-crank 245. The rod 243 preferably has screw-threaded engagement with the stud 244 to enable adjustment of the parts. Bell-crank 245 is carried by a pivot 246 on the main frame and has its opposite arm 247 arranged to engage the upper end of the lever 87 which controls the operation of the drain pump, as previously explained.

Referring to Figure 18, it will be seen that disc 124 has a depressed portion 248 normally in line with the associated arm 196 but after a predetermined portion of the cycle, a raised part 249 of the disc serves to operate the half-revolution clutch mechanism to rock the bell-crank 245 and bring about the operation of the pump. Subsequently a dwell 250 in the disc is brought in line with the arm 196 and the operation of the pump is arrested. After a brief period, another projecting portion 251 of the disc again causes operation of the pump for another drainage period, after which the remaining depressed portion of the disc maintains the pump in idle condition through the balance of the cycle.

Résumé

A brief summary of the operation of the machine will now be given:

When it is desired to wash a batch of clothes, the cover 17 is removed and the clothes are introduced into the basket 27, being preferably distributed fairly evenly around the center post. Suitable soap or other washing compounds should also be introduced at this time. The cover is then replaced and the knob 140 is turned until the pointer 142 indicates the desired washing period on the scale 143. The knob is then lifted and remains in its elevated position due to the engagement of the shoulder 146 on the latch 144 beneath the pin 147. The cycle of operation of the machine is initiated by this movement of the knob and the machine will automatically perform the sequence of operations required for the thorough cleaning of the clothes and the drying thereof to the desired extent. Figure 22 illustrates graphically the relative timing of the various phases of a cycle of the illustrative machine.

Upon the lifting of the knob 140, the discs 125 and 126 will rock their associated mercury switches to energize the solenoids 95 and 96 and cause the introduction of hot and cold water into the tub. The thermostat 185 (Fig. 23) will, at this time, control the circuit through the solenoid 96 and thus determine the quantity of cold water that will be mixed with the hot water in accordance with the water temperature desired in the tub. The thermostat 185, as will be understood, may be readily made adjustable to vary the temperature control, according to the nature of the clothes to be washed. As the tub becomes filled to the desired level, the float 181 will rock the mercury switch 174 to open the circuits through the solenoids 95 and 96 and thus shut off the supply of both hot and cold water. At the same time the switch 174 will close a circuit through the motor 36. The agitator will then, very soon, be set into oscillation because the clutch pinion 49 will be lowered at the commencement of the operation of the motor to engage the notches 50 with the pin 51 on the agitator drive shaft. This is accomplished by the action of the disc 123 upon its associated arm 196, which will have brought about the engagement or readiness for engagement of the tooth 211 on the pawl 209 with one of the notches in the clutch disc 203. During the first few revolutions of the motor the eccentric associated with this disc 203 will be turned through a half revolution and will bring about the operation of the clutch pinion in the manner specified.

The agitator will continue to operate for the period selected by the adjustment of the knob 140. At the end of this period the depressed portion 240 of the agitator control disc will bring about the disengagement of the clutch pinion 49. Shortly before the agitator is thrown out of operation, say about a minute before the end of its operation, the high portion 249 of the control disc 124 will be brought beneath the arm 196 associated with the pump control devices. This will cause the water to be drawn from the tub during a period of about nine minutes, in the illustrative machine. To avoid the possibility of the water valves being opened by the solenoids 95 and 96 while the pump is operating to withdraw the water from the tub, the initial high portions of the discs 125 and 126 extend over only a fourteen-minute period. The associated mercury switches, therefore, will not be operated if a washing period of less than a minute is selected. Under these conditions, however, the motor will be started, not by the float-controlled switch but by the switch 153 at, or just prior to, the commencement of operation of the pump. After the first two minutes of operation of the drain pump, the high portion 227 of the control disc 122 will have been brought beneath its associated arm 196 to bring about the operation of the spinner basket, which will continue for a period of about seven minutes, in the illustrative machine. After about three minutes of operation of the spinner, the projections 169 on the discs 125 and 126 will rock the switches 154 and 155 to energize the solenoids 95 and 96 and bring about the spraying of the clothes with fresh water. This spraying of the clothes as they are being whirled assists materially in the rinsing oepration.

At the conclusion of the nine-minute period of operation of the drain pump and the seven-minute period of operation of the spinner, the projections 171 on the control discs 125 and 126 will again cause the energization of the solenoids 95 and 96 and the introduction of water to fill the tub. Two minutes have been allowed in the illustrative machine for this purpose, although, as will be understood, the water control valves will be closed as soon as the tub is filled, due to the operation of the float-controlled switch 174. After the tub has been filled, the agitator is again oscillated for a period of about two minutes, this being effected under the control of the portion 241 of the disc 123. Upon the completion of this thorough rinsing of the clothes in fresh water, the drain pump is again operated for a period of about five minutes under the control of the high portion 251 of the control disc 124. After about the first two minutes of operation of the pump, the spinner basket is again rotated due to the operation of the associated arm 196 by the high portion 229 of control disc 122. At the end of the sequence of operations described, a projection 151 on the control disc 150 will engage the roller 152 on the latch 144 and will thus release the control mechanism, which will then drop by gravity to the position indicated in Fig. 6. This will carry the entire series of control discs away from the arms 195 and the pins 163 associated with the several mercury switches 153, 154 and 155 so that the motor will be arrested, the circuits through the solenoids 95 and 96 will be open and the various operating devices of the machine will be restored to normal.

While a definite sequence of operations, considered suitable for the thorough washing of clothes of all types, has been provided for in the illustrative machine, it will be apparent that various changes may be made in this sequence of operations to suit particular requirements. The periods of operation of the various devices may be increased or decreased, as desired, and the number of washing, extracting and draining operations during a complete cycle may be varied by simply modifying the form of the various control discs which are readily removable and replaceable. Should it be desired to arrest the operation of the machine at any point in a complete cycle, this may be accomplished at will by simply depressing the control knob 140. The collar 148 on the associated rod 133 will, at this time, engage the extension 149 of the latch 144 and bring about the release of the control drum with the same effect as if it had been automatically released by the control disc 150. Thus, if a particular batch of clothes is especially dirty, the machine might be permitted to carry through the first washing, draining and extracting operations and might then be stopped and re-set to repeat these operations after a fresh quantity of soap or other washing compound had been introduced into the tub.

Turning now to Figs. 24 and 25, there is shown a modification which may be embodied in the machine if desired. The devices illustrated in these figures are for the purpose of insuring the filling of the tub to the desired level prior to the commencement of the agitating means. This may be important where the water pressure is low or uncertain so that the fixed period, of say two minutes, allowed for the introduction of water, may be inadequate. At the commencement of the operation of the illustrative machine, this situation is taken care of by the fact that the motor is not set in operation until the tub has been filled to the desired level. However, during the period in which the water is introduced under control of the high portions 171 of control discs 125 and 126, prior to the second operation of the agitator, there is danger that in some communities the tub may not be filled within the time allowed. To offset this difficulty a stop arm 252 is pivotally mounted on a pin 253 carried by a bracket 254 secured to the frame 100. At the forward end of the arm 252 there is pivotally mounted, upon a pin 255, a pawl 256. A spring 257 tends to rock the pawl in a clockwise direction (Fig. 24) until its tail 258 engages a portion of the arm 252.

Now, the control disc 259, which corresponds with the disc 150 of the first-described embodiment of the invention, is rotated during the operation of the machine in the direction of the arrow 260. This happens to be in the opposite direction from that in which the control discs are rotated in the embodiment first described but this is of no particular significance since the parts might well be reversed in either embodiment. Now, as the disc 259 is rotated clockwise during the operation of the machine, a pin 261 is carried toward the position indicated in broken lines at 261a, where it will engage a shoulder on the under side of the pawl 256. This will occur when the portions 171 of the discs 125 and 126 are beneath their corresponding rollers 163 and are about to ride from beneath these rollers. The result is that the control drum is temporarily arrested, this being permitted by the frictional drive of the pinion 116, as previously explained. Slippage will simply occur between this pinion and the friction discs at its sides.

Connections are provided for disabling the pawl 256 as soon as the tub is filled to the desired level. For this purpose, a rod 262 is connected with a link 263 attached to the pivot 255 of the pawl. The upper end of the rod 262 is connected with one arm of a bell crank 264, the opposite arm of which is connected by a rod 265 with an arm of another bell crank 266. The opposite arm of this bell crank is connected by a rod 267 with a bracket 268 secured to the float arm 178. It will be apparent that as the float 181 is raised in response to the rise of the water to the desired level in the tub, the linkage described will be operated to lift the pawl 256 out of the path of the pin 261. If the tub is filled within the two-minute period allowed, the pawl will be withdrawn before the pin reaches the stop shoulder on the pawl. However, if the tub is not filled until after the period allowed, the drum will be held stationary, as explained, until the tub is filled and it will then be released to continue the control of the machine.

While an illustrative machine embodying the various features of the invention has been described in considerable detail, and certain modifications have been suggested, it will be understood that numerous other changes may be made without departing from the general principles and scope of the invention. The terms and expressions used herein have been employed as terms of description and not of limitation.

What we claim is:

1. In a control mechanism for an automatic washing and drying machine having a tub, means in said tub for washing clothes, centrifugal means for drying clothes, means for introducing water into said tub, a pump for withdrawing water from said tub, and a motor for actuating said apparatus, said control mechanism comprising rotatable means for directing the operation of said washing means, centrifugal means, introducing means and pump means in predetermined sequence, and a manually shiftable member for mechanically connecting said rotatable means with the motor and initiating said predetermined sequence of operations.

2. Control mechanism for an automatic washing and drying machine comprising a supporting structure, a motor, a plurality of control levers, rotatable cam means for controlling the operation of said control levers in predetermined sequence, and associated therewith a member having an axis mounted on said support for axial and rotational movement about the axis, said member being movable in an axial direction for mechanically connecting said rotatable means with said motor and initiating said predetermined sequence of operations, and said member being rotatably movable to select any point in said sequence of operations for the commencement thereof.

3. Controlling mechanism for an automatic washing and drying machine having a tub, means in said tub for washing clothes, centrifugal means for drying clothes, means for introducing water into said tub, pump means for withdrawing water from said tub, said control mechanism comprising pivoted control means associated with said washing means, centrifugal means, introducing means and said pump means, rotatable cam means adapted to operate said pivoted control means in a predetermined sequence but normally out of operative position for said purpose, and rotatably and axially movable means for selectively rotating said cam means or for shifting said cam means in a direction at right angles to its axis of rotation to move said cam means into operative position and cause the operation thereof.

4. Control mechanism for an automatic washing and drying machine comprising a support, a cam shaft pivotally mounted on said support for angular movement in a plane transverse to its axis, said cam shaft also being mounted for rotational movement about its own axis, a plurality of cam disks secured on said shaft for rotation therewith, a second shaft mounted for rotational movement on said support and disposed substantially parallel to said cam shaft, a plurality of control members freely mounted on said second shaft and independent of each other, a plurality of half revolution clutches, one for each control member, for coupling said control member to said second shaft, each of said clutches having a cam follower which actuates said clutch to couple its associated control member to said second shaft whenever said cam follower is moved by its associated cam disk, a control rod extending substantially perpendicular to said cam shaft and mounted on said support for axial and rotational movement, said control rod being axially movable for moving said cam shaft about its pivoted support to an operating position with said cam disks against said cam followers, means for locking said cam shaft in its operating position, and means for rotating said cam shaft and said second shaft.

5. Control mechanism for an automatic washing and drying machine comprising a support, a cam shaft pivotally mounted on said support for angular movement in a plane transverse to its axis, said cam shaft also being mounted for rotational movement about its own axis, means actuated by rotational movement of said cam shaft for controlling operation of said washing and drying machine, a control rod extending substantially perpendicular to said cam shaft and mounted on said support for axial and rotational movement, said control rod being axially movable for moving said cam shaft about its pivoted support to and from an operating position with respect to said means, and means for rotating said control rod when said control rod is in an axial position where said cam shaft is away from said first means for rotating said cam shaft to any desired selected angular position.

6. Control mechanism for an automatic washing and drying machine comprising a support, a cam shaft pivotally mounted on said support for angular movement in a plane transverse to its axis, said cam shaft also being mounted for rotational movement about its own axis, means actuated by rotational movement of said cam shaft for controlling operation of said washing and drying machine, a control rod extending substantially perpendicular to said cam shaft and mounted on said support for axial and rotational movement, said control rod being axially movable for moving said cam shaft about its pivoted support to and from an operating position with respect to said means, means for latching said control rod in an axial position where said cam shaft is in its operating position, and means for rotating said control rod to change the angular position of said cam shaft.

PETER EDUARD GELDHOF.
LUTHER RINGER.